United States Patent
Hsu et al.

(10) Patent No.: US 7,659,910 B2
(45) Date of Patent: Feb. 9, 2010

(54) HUE DIVING AND JUDGING DEVICE

(75) Inventors: Kai-Hsiang Hsu, Tucheng (TW);
Yi-Chia Shan, Jhongli (TW);
Tsan-Hung Tsai, Sanchong (TW);
Hsu-Chia Kao, Pingjhen (TW)

(73) Assignee: Marketech International Corp., Taipei (TW)

( * ) Notice: Subject to any disclaimer, the term of this patent is extended or adjusted under 35 U.S.C. 154(b) by 490 days.

(21) Appl. No.: 11/723,903

(22) Filed: Mar. 22, 2007

(65) Prior Publication Data
US 2007/0223020 A1 Sep. 27, 2007

(30) Foreign Application Priority Data
Mar. 24, 2006 (TW) .............................. 95110413 A

(51) Int. Cl.
G09G 5/02 (2006.01)
G03F 3/08 (2006.01)
G06F 15/00 (2006.01)
G06T 7/40 (2006.01)
H04N 5/46 (2006.01)
H04N 9/64 (2006.01)
G06K 9/00 (2006.01)
H04N 1/60 (2006.01)
G06K 9/40 (2006.01)

(52) U.S. Cl. ................... 345/589; 345/591; 345/601; 345/549; 345/606; 348/557; 348/612; 348/703; 358/515; 358/518; 358/520; 358/1.9; 382/162; 382/167; 382/254; 382/274

(58) Field of Classification Search ................. 345/581, 345/589–591, 593, 597, 600–604, 549, 606; 348/557, 560, 582, 612, 600–603, 649–651, 348/703; 358/515–525; 382/162–167, 254, 382/274, 276, 300
See application file for complete search history.

(56) References Cited

U.S. PATENT DOCUMENTS

| 4,989,079 | A | * | 1/1991 | Ito | 358/520 |
| 5,309,228 | A | * | 5/1994 | Nakamura | 358/500 |
| 6,788,441 | B1 | * | 9/2004 | Ohkawa | 358/520 |
| 2004/0174550 | A1 | * | 9/2004 | Ohkawa | 358/1.9 |
| 2006/0164700 | A1 | * | 7/2006 | Hayashi | 358/518 |

* cited by examiner

Primary Examiner—Wesner Sajous
(74) Attorney, Agent, or Firm—Birch, Stewart, Kolasch & Birch, LLP

(57) ABSTRACT

The invention discloses a hue dividing and judging device including a memory unit, a calculation module, and a judgment module. The memory unit is used for storing a look-up table, and the look-up table records N boundaries, wherein the N boundaries includes j+1 operative boundaries for defining j color areas. The calculation module is used for calculating the hue of each pixel of an input image. According to the look-up table, the judgment module is used for judging where the hue of each pixel falls within two of the operative boundaries, so as to judge that the hue of the pixel of the input image falls into which one of the color areas. Accordingly, if there are more operative boundaries recorded in the look-up table, the hue will be divided into more color areas, and the user will have more choices for adjusting the color of the input image.

7 Claims, 3 Drawing Sheets

HUE DIVING AND JUDGING DEVICE

BACKGROUND OF THE INVENTION

1. Field of the Invention

The invention relates to a device, applied to a display system and being capable of dividing hue of a color space into a plurality of color areas. Furthermore, the device of the invention can also judge that the hue of each pixel of an input image falls into which one of the color areas. More particularly, the invention utilizes a look-up table to divide the hue based on practical applications instead of changing hardware circuit.

2. Description of the Prior Art

When a user is watching an image, he/she may adjust parts of the colors of the image. For example, the user may adjust the color of the sky to be bluer, the color of the ground to be greener, and so on. In general, the adjustable parameters for an image include lightness, hue, and saturation; however, dividing the colors by hue is more suitable for most of the applications.

Figure 1:
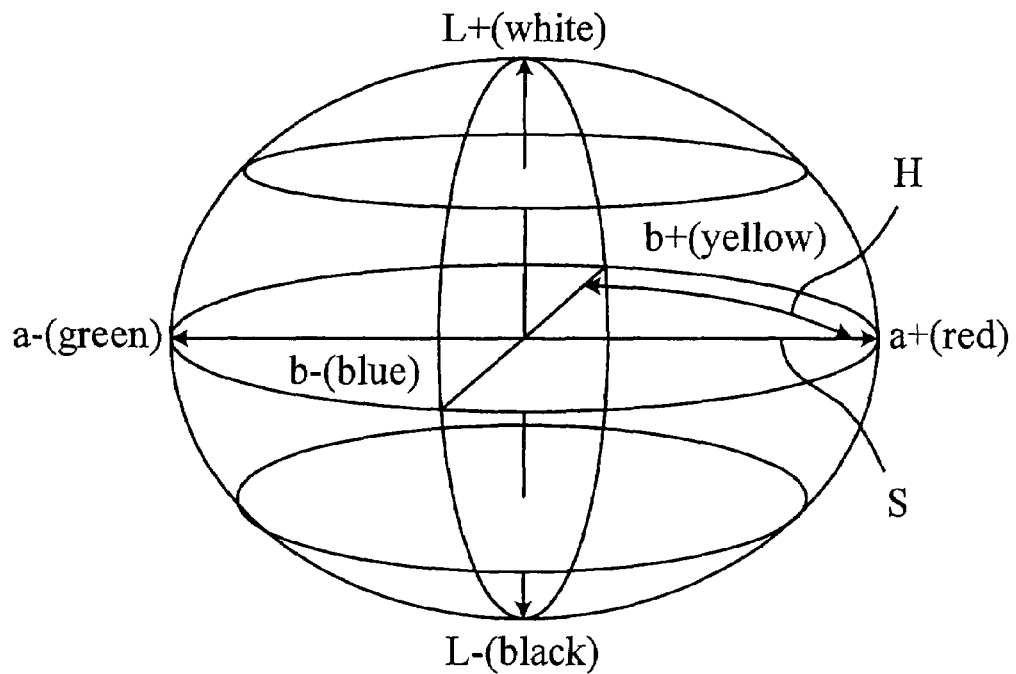

To process the colors of image, the original color space (e.g. RGB) of the image should be converted to another color space with lightness (namely Y) separated from color (namely C), such as YCbCr, YUV, CIELab, and so on, so as to obtain information of lightness, hue, and saturation regarding the image. Referring to FIG. 1, FIG. 1 is a schematic diagram illustrating Lab color space. In Lab color space, L represents lightness component, and a and b represent color components. As shown in FIG. 1, lightness (L) is controlled by altitude, hue (H) is controlled by angle, and saturation (S) is controlled by radius.

Figure 2:
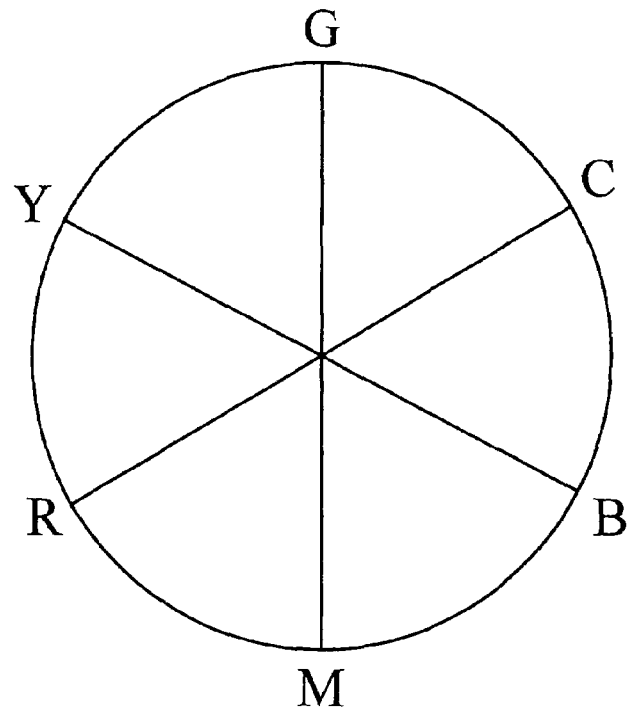

In the color space with lightness separated from color, the hue ranges from 0° to 360°. Based on the practical application, the hue can be divided into a plurality of color areas by the range of angles. Referring to FIG. 2, FIG. 2 is a schematic diagram illustrating the hue being divided into six color areas by the prior art. In the prior art, the conventional integrated circuit (IC) for adjusting colors often divides the hue into six color areas, i.e. red (R), blue (B), green (G), cyan (C), magenta (M), and yellow (Y), as shown in FIG. 2. For some ICs, the color of skin is added to form a seventh color area for the user's convenience. However, when the aforesaid prior art is used to adjust the color, some problems listed below may occur.

(1) The color, which the user wants to adjust, cannot be classified to the aforesaid six or seven color areas.
(2) The hue can only be divided into few color areas.
(3) In practical applications, as users do not know the desired color of the image falls into which one of the color areas, the desired quality of image usually cannot be obtained.

Therefore, the scope of the invention is to provide a hue dividing and judging device to solve the aforementioned problems.

SUMMARY OF THE INVENTION

A scope of the invention is to provide a device for dividing the hue of a color space into a plurality of color areas.

Another scope of the invention is to provide a device for judging that the hue of each pixel of an input image falls into which one of the color areas.

According to a preferred embodiment, the hue dividing and judging device, disclosed by the invention, is applied to a display system and used for dividing the hue of a color space into j color areas and for judging that the hue of each pixel of an input image falls into which one of the j color areas.

In this embodiment, the hue dividing and judging device comprises a memory unit, a calculation module, and a judgment module. The memory unit is used for storing a look-up table, and the look-up table records N boundaries including j+1 operative boundaries for defining the j color areas, wherein N is a natural number, and j is an integer, ranging from 1 to N−1. And, the calculation module is used for calculating the hue of each pixel of the input image. According to the j+1 operative boundaries recorded in the look-up table, the judgment module is used for judging that the hue of the color space is divided into how many color areas and for judging where the hue of each pixel falls within two of the j+1 operative boundaries, so as to judge that the hue of each pixel of the input image falls into which one of the j color areas. Accordingly, if the look-up table records more operative boundaries, the hue will be divided into more color areas, and the user will have more choices to adjust the color of an image than those of the prior art.

Therefore, according to the invention, when the designer designs an IC for adjusting colors, he/she can increase or decrease the number of color areas and the range of each color area by changing the number of operative boundaries and the value of each operative boundary recorded in the look-up table. Furthermore, the hue of each pixel of the input image falling into which color area can be determined by judging where the hue of the pixel falls within two of the operative boundaries. Accordingly, the invention is very convenient for IC designers or users.

The advantage and spirit of the invention may be understood by the following recitations together with the appended drawings.

BRIEF DESCRIPTION OF THE APPENDED DRAWINGS

Figure 3A:
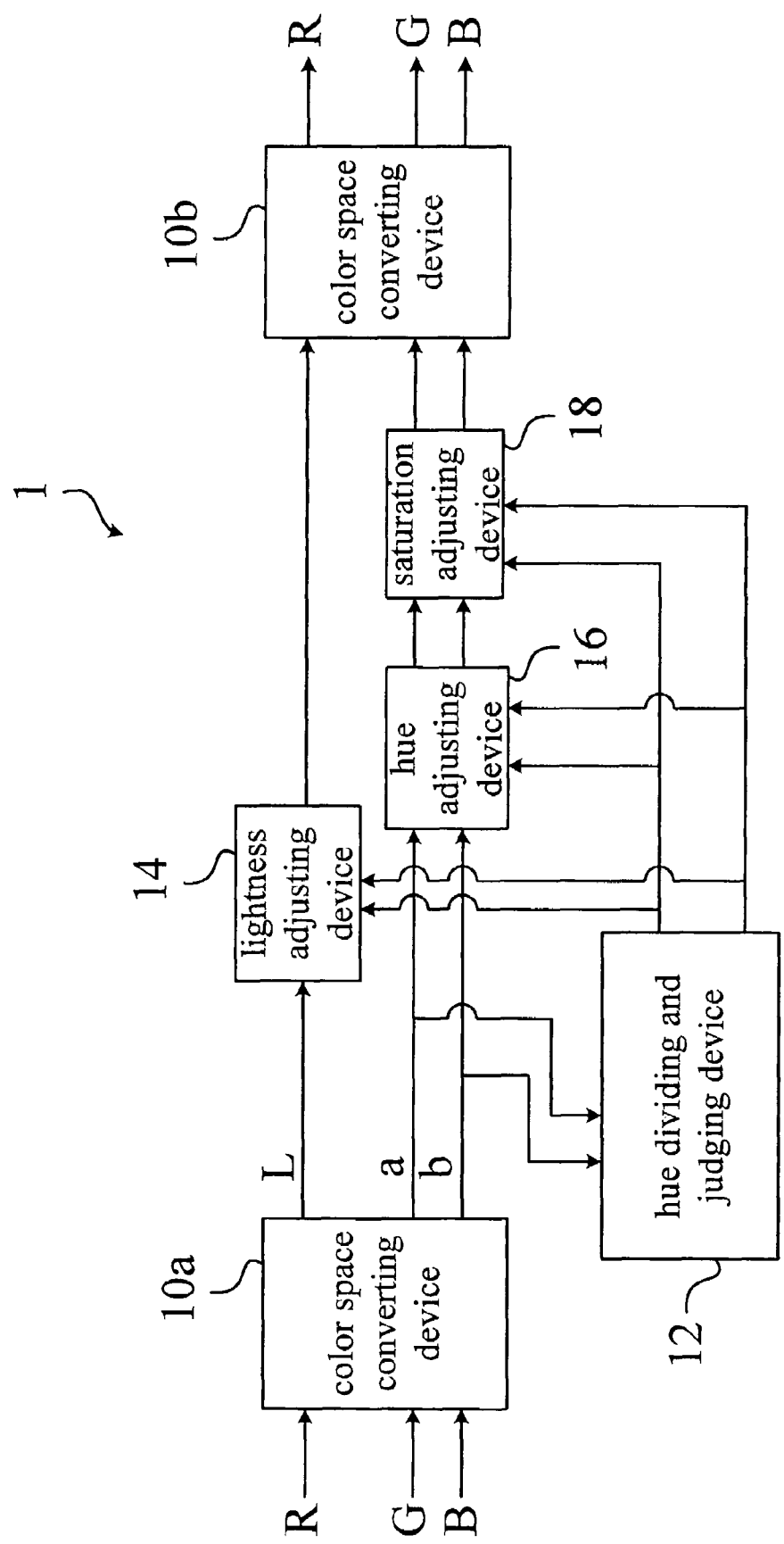
Figure 3B:
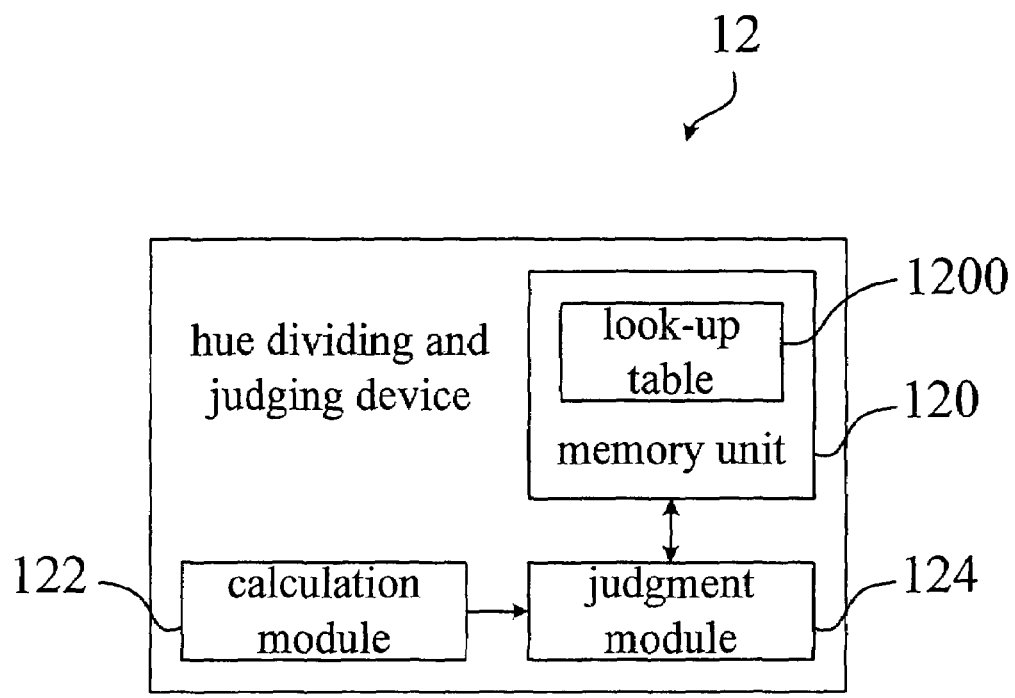
Figure 4:
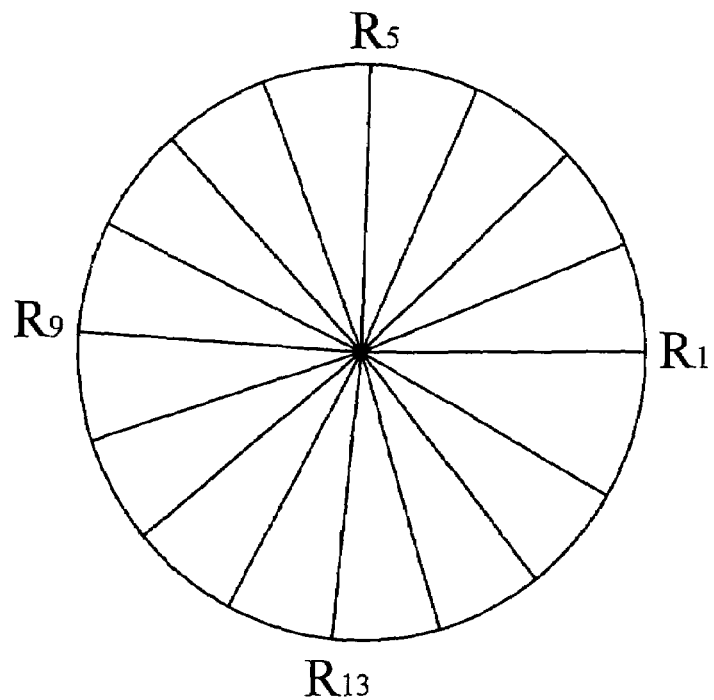

FIG. 1 is a schematic diagram illustrating Lab color space.
FIG. 2 is a schematic diagram illustrating the hue being divided into six color areas by the prior art.
FIG. 3A is a functional block diagram illustrating the display system according to a preferred embodiment of the invention.
FIG. 3B is a functional block diagram illustrating the hue dividing and judging device shown in FIG. 3A.
FIG. 4 is a schematic diagram illustrating the hue being divided into sixteen color areas by the invention.

DETAILED DESCRIPTION OF THE INVENTION

Referring to FIGS. 3A and 3B, FIG. 3A is a functional block diagram illustrating the display system 1 according to a preferred embodiment of the invention, and FIG. 3B is a functional block diagram illustrating the hue dividing and judging device 12 shown in FIG. 3A. As shown in FIG. 3A, the display system 1 comprises two color space converting devices 10a and 10b, a hue dividing and judging device 12, a lightness adjusting device 14, a hue adjusting device 16, and a saturation adjusting device 18. As shown in FIG. 3B, the hue dividing and judging device 12 comprises a memory unit 120, a calculation module 122, and a judgment module 124. The memory unit 120 can be a non-volatile memory, such as a flash memory or the like.

The hue dividing and judging device 12, disclosed by the invention, is applied to the display system 1, and is used for dividing the hue of a color space into j color areas and for judging that the hue of each pixel of an input image falls into which one of the j color areas. The invention is adaptive for all color spaces with lightness separated from color, such as YCbCr, YUV, YIQ, CIELUV, CIELab, and so on. In this embodiment, the color space converting device 10a of the display system 1 will convert the original color space (e.g. RGB) of the input image into the color space with lightness separated from color (e.g. CIELab), so as to obtain the information of lightness, hue, and saturation, wherein the hue ranges from 0° to 360°.

As shown in FIG. 3, the memory unit 120 stores a look-up table 1200. And, the look-up table 1200 records N boundaries which include j+1 operative boundaries for defining the j color areas, wherein N is a natural number, and j is an integer ranging from 1 to N−1. For example, the look-up table may record 17 boundaries $R_1 \sim R_{17}$ (i.e. N=17). In the practical application, each boundary may be saved by 9 bits, so the value of each boundary ranges from 0 to 511, and each of the operative boundaries is smaller than 511.

Therefore, the boundaries $R_1 \sim R_{17}$ recorded in the look-up table 1200 can be respectively set as 0, 60, 120, 180, 240, 300, 360, 511, 511, 511, 511, 511, 511, 511, 511, 511, 511, so as to define 6 color areas (i.e. j=6), and each color area covers a range of the hue with 60°. In another preferred embodiment, the boundaries $R_1 \sim R_{17}$ recorded in the look-up table 1200 can be respectively set as 0, 22, 44, 66, 88, 110, 132, 154, 176, 198, 220, 242, 264, 286, 308, 330, 360, so as to define 16 color areas (i.e. j=16), and each color area covers a range of the hue with about 22°, as shown in FIG. 4. In another preferred embodiment, the boundaries $R_1 \sim R_{17}$ recorded in the look-up table 1200 can be also respectively set as 0, 18, 40, 76, 89, 130, 142, 154, 181, 198, 233, 242, 264, 276, 318, 350, 360, so as to define 16 color areas (i.e. j=16), and each color area covers different range of the hue. In other words, the designer can utilize a memory unit to divide the hue into different numbers of color areas and further determine the range of the hue for each color area. It is quite convenient to the designer.

It should be noted that the invention may utilize the following manner to judge the number of color areas. The manner is that if the boundary read by the judgment module 124 is larger than or equal to 360, a logic number "1" will be generated; and if not, a logic number "0" will be produced. Besides, if the boundaries recorded in the look-up table 1200 are set as 0, 22, 44, 66, 88, 110, 132, 154, 176, 198, 220, 242, 264, 286, 308, 330, 360 (i.e. the hue is divided into 16 color areas), a series (0, 0, 0, 0, 0, 0, 0, 0, 0, 0, 0, 0, 0, 0, 0, 0, 1) will be generated, wherein the first "1" is located in the seventeenth location of the series. That is to say, the judgment module 124 can judge the number of color areas by the location of the first "1" within the series.

In this embodiment, the calculation module 122 is used for calculating the hue of each pixel of the input image. According to the look-up table 1200, the judgment module 124 is used for judging where the hue of each pixel falls within two of the seven operative boundaries (j=6), so as to judge that the hue of each pixel of the input image belongs to which one of the six color areas. When the hue (H) of the pixel complies with the following inequality, the hue (H) of the pixel falls into the (j−i)-th color area of the j color areas: $R_{j-1}° \leq H < R_j°$. And, when the hue (H) of the pixel complies with the following inequality, the hue (H) of the pixel falls into the j-th color area of the j color areas: $0° \leq H < R_1°$ or $R_j° \leq H < 360°$. In other words, if the hue of one pixel is 150° calculated by the calculation module 122, the hue of the pixel falls into the third color area (120°≦150°<180°).

In another preferred embodiment, the boundaries $R_1 \sim R_{17}$ recorded in the look-up table 1200 can be set as 10, 32, 54, 76, 98, 120, 142, 164, 186, 208, 230, 252, 274, 296, 318, 340, and 370; namely, $R_1$ is not equal to 0. However, if the hue of one pixel is 5°, the hue of the pixel falls into the sixteenth color area (0°≦5°<10°); if the hue of one pixel is 355°, the hue of the pixel also falls into the sixteenth color area (310°≦355°<360°); if the hue of one pixel is 35°, the hue of the pixel falls into the second color area (32°≦35°<54°), and so on. Accordingly, the designer can change not only the number of color areas but also the range of the hue of each color area.

Referring to FIG. 3A, after the operation of the hue dividing and judging device 12, the input image will be processed by the lightness adjusting device 14, the hue adjusting device 16, and the saturation adjusting device 18 respectively. Eventually, the color space of the input image will be converted by the color space converting device 10b into the original color space, e.g. CIELab to RGB. The related technology can be easily achieved by one skilled in the art and will not be mentioned in detail.

Compared to the prior art, according to the invention, as the designer designs an IC for adjusting colors, he/she can increase or decrease the number of color areas and the range of each color area by changing the number of operative boundaries and the value of each operative boundary recorded in the look-up table. Furthermore, the hue of each pixel of the input image falling into which color area can be determined by judging where the hue of the pixel falls within two of the operative boundaries. Accordingly, the invention is very convenient for IC designers or users.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. In a display system, a hue dividing and judging device being used for dividing hue of a color space into j color areas and for judging that the hue of a pixel of an input image falls into which one of the j color areas, the device comprising:

a memory unit for storing a look-up table, the look-up table recording N boundaries including j+1 operative boundaries for defining the j color areas, N being a natural number, j being an integer ranging between 1 and N−1;

a calculation module for calculating the hue of the pixel of the input image; and a judgment module, according to the j+1 operative boundaries recorded in the look-up table, for judging that the hue of the color space is divided into the j color areas and for judging that the hue of the pixel is between which two of the j+1 operative boundaries, so as to judge that the hue of the pixel of the input image falls into which one of the j color areas.

2. The device of claim 1, wherein lightness is separated from color in the color space.

3. The device of claim 1, wherein the hue of the color space ranges from 0° to 360°.

4. The device of claim 3, wherein the first operative boundary is $R_1°$, the (j+1)-th operative boundary is $(360+R_1)°$, and $R_1$ is 0 or a natural number.

5. The device of claim 4, wherein the j-th operative boundary is $R_j°$, the (j−1)-th operative boundary is $R_{j-1}°$, and when the hue (H) of the pixel complies with the following inequality, the hue (H) of the pixel falls into the (j−i)-th color area of the j color areas:

$R_{j-1}° \leq H < R_j°$.

6. The device of claim 5, wherein when the hue (H) of the pixel complies with the following inequality, the hue (H) of the pixel falls into the j-th color area of the j color areas:

$0° \leq H < R_1°$ or $R_j° \leq H < 360°$.

7. The device of claim 1, wherein the memory unit is a non-volatile memory.

* * * * *